Patented July 14, 1925.

1,545,742

UNITED STATES PATENT OFFICE.

GEORGE O. CURME, JR., OF CLENDENIN, WEST VIRGINIA, ASSIGNOR TO CARBIDE & CARBON CHEMICALS CORPORATION, A CORPORATION OF NEW YORK.

PROCESS OF MAKING ISOPROPYL CHLORIDE.

No Drawing. Original application filed May 17, 1922, Serial No. 561,715. Divided and this application filed May 2, 1923. Serial No. 636,243.

*To all whom it may concern:*

Be it known that I, GEORGE O. CURME, Jr., a citizen of the United States, residing at Clendenin, in the county of Kanawha and State of West Virginia, have invented certain new and useful Improvements in Processes of Making Isopropyl Chloride, of which the following is a specification.

This invention relates to the production of isopropyl chloride.

In my application Serial No. 561,715, filed May 17, 1922, of which the present is a division, I have shown that alkyl chlorides may be simply and economically prepared by bringing olefines into reactive relation with hydrogen chloride, preferably under anhydrous conditions. As stated in that application, superatmospheric pressure or a catalyst such as aluminum chloride, or both, are desirable in some cases to facilitate the formation of the alkyl chloride.

In accordance with the present invention, propylene and hydrogen chloride may be caused to react to form isopropyl chloride by merely bringing them into contact in anhydrous, gaseous condition. However, the yield is increased by subjecting the reacting gases to pressures above normal. Placing the mixed gases in approximately their combining proportions under a pressure of 15 atmospheres has given good yields. Heating is unnecessary, though not precluded.

When working under anhydrous conditions, any of the reagents which fail to combine may be readily separated from the product because of their difference in volatility. Substances corrosive to metals are not present at any stage, and iron apparatus may be used. No special form of apparatus is required for carrying out the process.

The invention is not limited to a reaction between the vapor phases of the combining substances, as these may react in solution. The solvent employed may be the reaction product, or other suitable solvent, preferably anhydrous.

I claim:

1. Process of making isopropyl chloride, which comprises causing hydrochloric acid to react on propylene under anhydrous conditions.

2. Process according to claim 1, in which the reaction takes place under superatmospheric pressure.

In testimony whereof, I affix my signature.

GEORGE O. CURME, JR.